United States Patent [19]

Miller

[11] 4,283,826
[45] Aug. 18, 1981

[54] TUBE EXTRACTING MECHANISM

[75] Inventor: Charlie D. Miller, East Syracuse, N.Y.

[73] Assignee: Carrier Corporation, Syracuse, N.Y.

[21] Appl. No.: 18,549

[22] Filed: Mar. 8, 1979

Related U.S. Application Data

[63] Continuation-in-part of Ser. No. 907,239, May 18, 1978, abandoned.

[51] Int. Cl.³ .............................................. B23P 19/04
[52] U.S. Cl. .................................. 29/252; 29/157.3 C; 294/94
[58] Field of Search ................... 29/157.3 R, 157.3 A, 29/157.3 B, 157.3 C, 252, 234, 265, 282; 81/72; 279/2 A, 2 R; 294/94, 96

[56] References Cited

U.S. PATENT DOCUMENTS

| | | | |
|---|---|---|---|
| 1,964,023 | 6/1934 | Armstrong | 29/252 |
| 2,226,078 | 12/1940 | Spahn | 81/72 |
| 2,360,054 | 10/1944 | Haas | 29/227 |
| 2,697,872 | 12/1954 | Armstrong | 29/252 |
| 3,367,011 | 2/1968 | Sipher | 29/252 |
| 3,369,287 | 2/1968 | Brocheti | 29/252 |
| 3,791,011 | 2/1974 | Keys | 29/252 |
| 4,077,102 | 3/1978 | Smith | 29/252 |

FOREIGN PATENT DOCUMENTS 248443 2/1968 U.S.S.R. ..................................... 29/252

Primary Examiner—James L. Jones, Jr.
Attorney, Agent, or Firm—J. Raymond Curtin; John S. Sensny

[57] ABSTRACT

A tube extracting mechanism comprising an elongated frame defining an opening in the front end thereof and a longitudinally extending passageway in communication with the opening. A sleeve is slidably supported by the frame for longitudinal movement within the passageway. The mechanism further comprises an expandable jaw supported by the sleeve for longitudinal movement therewith, and a mandrel in communication with the expandable jaw for expanding the jaw. A plurality of teeth extend annularly about and radially outward from the expandable jaw. Each tooth includes an annularly extending central section having a gripping edge generally defining an arc for engaging the interior surface of a tube, and a pair of end sections wherein each end section annularly extends from the central section and includes a tapered edge, wherein the tapered edges radially taper inward to facilitate withdrawing the tube gripping apparatus from the tube. An expansion hydraulic cylinder is provided for imparting longitudinal movement to the mandrel, and pulling hydraulic cylinders are provided for imparting longitudinal movement to the sleeve and expandable jaw.

15 Claims, 14 Drawing Figures

TUBE EXTRACTING MECHANISM

BACKGROUND OF THE INVENTION

This application is a continuation-in-part of my copending application Ser. No. 907,239, filed May 18, 1978, now abandoned.

This invention relates to a mechanism and method for extracting tubes from a tube sheet.

Heat exchangers are often comprised of a multiplicity of heat exchange tubes which extend between and are generally supported by at least one tube sheet. The tube sheet has a series of holes cut therein, the tubes are inserted into the holes in the tube sheet, and then the tubes are expanded in the area of the tube sheet so that pressure contact exists between the tubes and the tube sheet.

At times, due to malfunctions or normal maintenance, it is necessary to remove one or even all of the tubes used in a given heat exchanger unit. Heretofore, various mechanisms have been employed for extracting tubes from tube sheets. Typical prior art devices are disclosed in U.S. Pat. Nos. 1,964,023; 2,697,872; 3,367,011; 3,369,287; 3,791,011; and 4,077,102. These references appear to be the prior art which is most relevant to the present application. As can be seen, these mechanism include a radially expandable jaw means, and a plurality of teeth extend annularly about and radially outward from the jaw means. In each of the devices disclosed in these patents, expansion means having a rearwardly tapered wedge longitudinally extends through the radially expandable jaw means, and the jaw means is expanded by pulling the expansion means toward the back of the device. This movement brings the tapered portion of the wedge into contact with the inside of the jaw means, and further rearward movement of the wedge forces the teeth of the jaw means radially outward into the inner surface of the tube. Once the teeth securely grip the tube, the jaw means is pulled toward the back of the extracting mechanism, pulling the tube from the tube sheet. Thus, it is seen that movement in the same direction—toward the back of the extracting mechanism—is used to both expand the jaw means and pull the tube from the tube sheet.

The prior art devices, for a number of reasons, have not been entirely satisfactory. First, the range of sizes of tubes that can be extracted by each device has been relatively limited. This is due, inter alia, to the fact that the extent to which the jaw means can expand radially has been fairly narrow. Second, the backwards movement of the expansion means, which expands the jaw means radially, frequently causes the jaw means to also move backwards before the jaw means develops a secure grip on the tube. This results in the jaw means dragging against the inside surface of the tube, which deleteriously affects the jaw means.

Moreover, a serious problem with prior art devices has been that the jaw means frequently break. Several factors contribute to this problem. One of these factors is that, commonly, the back of the jaw means is rigidly secured to a part of the extracting mechanism which does not move radially with the jaw means. The jaw means, as it is pushed outward radially, bends relative to this fixed part, resulting in what can be a significant strain on the jaw means. Further, the prior art arrangements typically result in a relatively small area of contact between the jaw means and the expansion means. The expansion means is not able to provide evenly distributed support for the jaw means as the jaw means is forced into pressure contact with the tube, resulting in high, localized stresses in the jaw means.

Additionally, during the above-described extracting process, more specifically while the teeth securely grip the inner side wall of the tube and the jaw means and teeth are pulled away from the tube sheet to pull the tube therefrom, portions of the tube side wall are pushed radially inward by the teeth toward the center of the tube. This inward deformation of material decreases the inside diameter of the tube, and the deformed material may scrape or drag against or otherwise interfere with the teeth as the teeth and jaw means are withdrawn from the tube. This interference increases the time needed to withdraw the teeth and jaw means from the tube, increasing the cost of the entire tube extracting process. Moreover, the scrapping or dragging may damage the teeth, decreasing their effective life span.

Many of these problems are minimized or eliminated, in accordance with one aspect of the present invention, by expanding the jaw means radially by means of movement of the expansion means in the direction away from the back of the extracting mechanism. With this arrangement, the expansion means can come to a tapered end within the jaw means. This, as discussed in greater detail below, allows the jaw means to be expanded a greater amount than if, as is the case with prior art devices, the expansion means extends completely through the jaw means. The increased expandability of the jaw means increases the range of tube diameter sizes with which the extracting apparatus can be used.

In addition, with the present invention the expansion means provides a very evenly distributed support for the jaw means when the jaw means is in pressure contact with the tube, significantly decreasing the maximum stress felt at any one point of the jaw means and thereby increasing the operational life of the jaw means. Moreover, as explained subsequently, the longitudinal force on the jaw means as it is expanded in a radial direction in counterbalanced. In this way, the tendency of the jaw means to drag against the surface of the inside of the tube as the jaw means expands is subsequently eliminated, further extending the operational life of the jaw means.

The extracting mechanism is further improved, in accordance with another aspect of the present invention by tapering annular ends of the teeth of the jaw means to reduce the height thereof when the jaw means is in a radially contracted position. In this manner, the clearance between the jaw means and a tube, as the jaw means is withdrawn from the tube, is increased, substantially facilitating withdrawing the jaw means from the tube. Less time and skill are needed to withdraw the jaw means from the tube, decreasing the cost thereof. In addition, the amount of scrapping, dragging or tearing between the teeth and the insides of the tube is decreased, and this increases the effective life span of the teeth. Because of the above-discussed advantages and other reasons disclosed below, it is believed that the present invention patentably distinguishes the above-cited prior art.

SUMMARY OF THE INVENTION

In view of the above, an object of this invention is to improve tube extracting mechanisms and methods.

Another object of the present invention is to provide a tube extracting method and mechanism wherein an expandable jaw means is expanded by movement of an expansion means in a direction away from the back of the mechanism.

A further object of this invention is to increase the area of contact between the expandable jaw means and the expansion means of a tube extracting mechanism when the jaw means is in pressure contact with a tube that is to be extracted from a tube sheet.

A still another object of the present invention is to minimize the dragging tendency developed between the inside of a tube and the expandable jaw means of a tube extraction mechanism when the jaw means is used to extract the tube from a tube sheet.

A further object of this invention is to improve the jaw means of a tube extracting mechanism, particularly the gripping teeth thereof.

Still another object of the present invention is to taper the annular ends of gripping teeth of a radially expandable jaw means to decrease the height of the gripping teeth when the jaw means is in a radially contracted position.

These and other objectives are attained with a tube extracting mechanism comprising an elongated frame defining an opening in the front end thereof and a longitudinally extending passageway in communication with the opening. A sleeve is positioned in the passageway and is slidably supported by the frame for longitudinal movement within the passageway in a first direction toward the opening and in a second direction away from the opening. The mechanism further comprises expandable jaw means supported by the sleeve for longitudinal movement therewith, wherein the jaw means is movable through the opening; and expansion means in communication with the expandable jaw means for expanding the jaw means, wherein longitudinal movement of the expansion means in the first direction expands the jaw means. Expansion power means are provided for imparting longitudinal movement in the first direction to the expansion means, and pulling power means connected to the frame are provided for imparting longitudinal movement in the second direction to the sleeve and expandable jaw means.

Preferably, the jaw means includes a plurality of radially extending teeth. Each tooth, in turn, includes an annularly extending central section having a gripping edge generally defining an arc for engaging the interior surface of a tube, and a pair of end sections wherein each end section annularly extends from the central section and includes a tapered edge, wherein the tapered edges radially taper inward to facilitate withdrawing the jaw means from the tube.

DESCRIPTION OF THE PREFERRED EMBODIMENT

Figure 1:
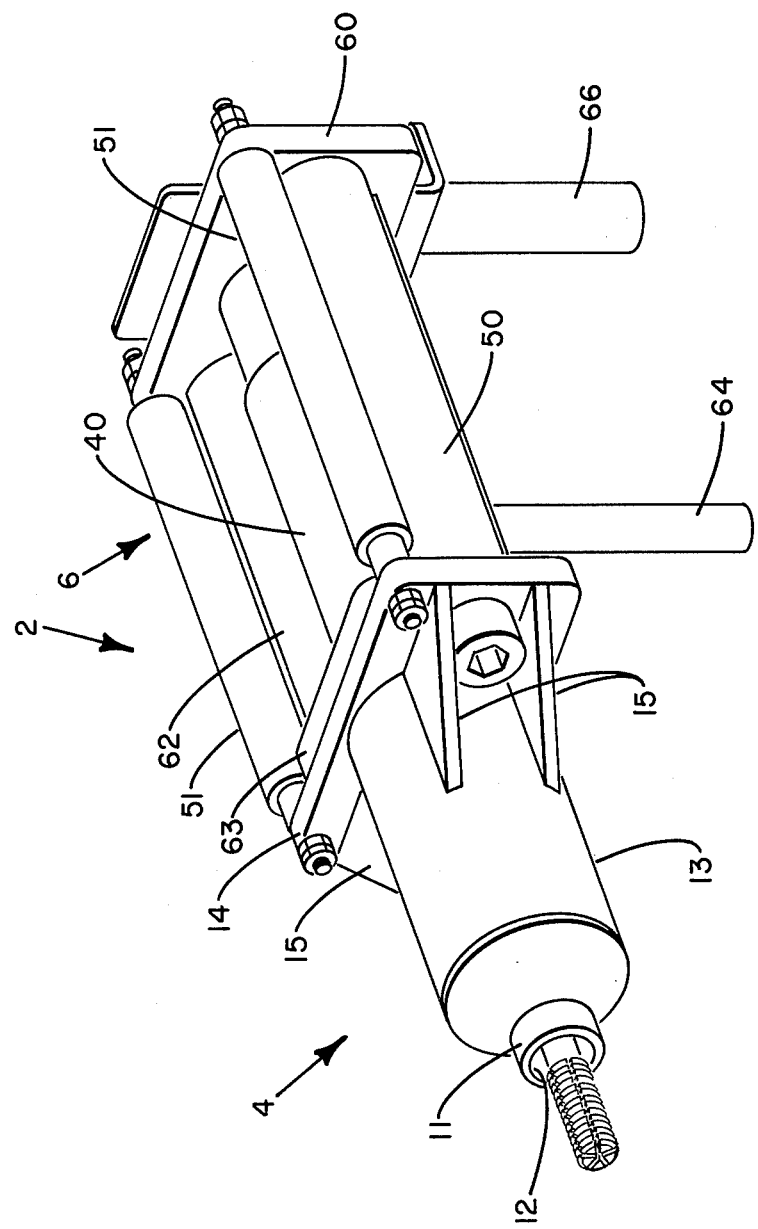
FIG. 1 is a perspective view of a tube extracting mechanism constructed in accordance with the present invention.

FIG. 1 depicts a tube extracting mechanism 2 constructed in accordance with the present invention. Extracting mechanism 2 comprises, generally, an elongated, stationary frame or assembly 4, a movable frame or assembly 6, and expandable jaw means 30. Stationary frame 4 includes a nose piece 11 defining an opening 12 in the front end of the stationay frame, a cylindrical housing section 13, a front plate 14, and braces 15. The front end of cylindrical housing section 13 is connected to nose piece 11, and the back end of the cylindrical housing section is connected to front plate 14. Braces 15 serve to reinforce the connection between cylindrical housing section 13 and front plate 14. Movable frame 6 includes expansion power means 40, pulling power means 50, back plate 60, longitudinal connecting member 62, and mid plate 63. Back plate 60 and mid plate 63 are connected by means of connecting members 62 for unitary longitudinal movement. Grips 64 and 66 are provided to facilitate handling of the mechanism 2.

Figure 2:
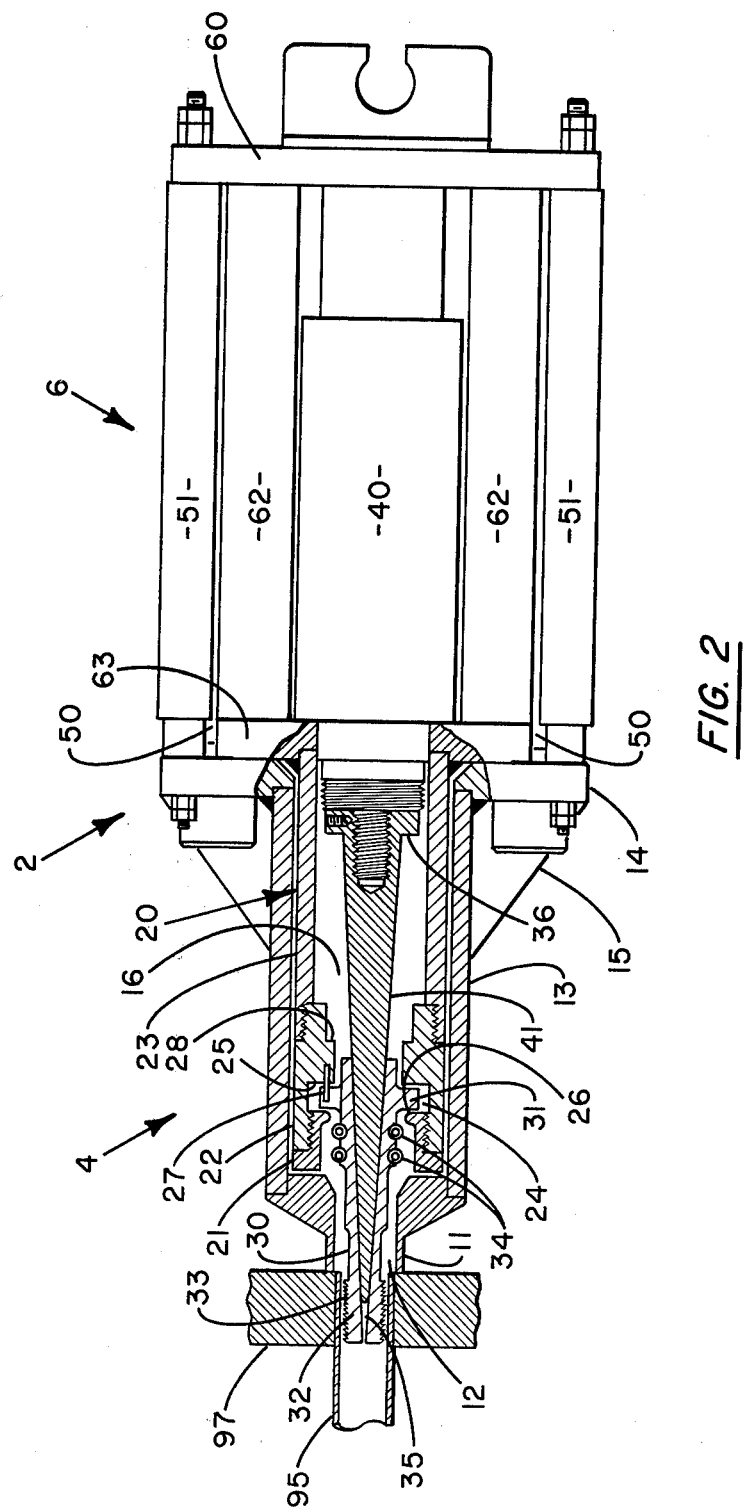
FIGS. 2 through 4 are longitudinal sectional views of the extracting mechanism shown in FIG. 1 illustrating the mechanism in various stages of operation.
Figure 3:
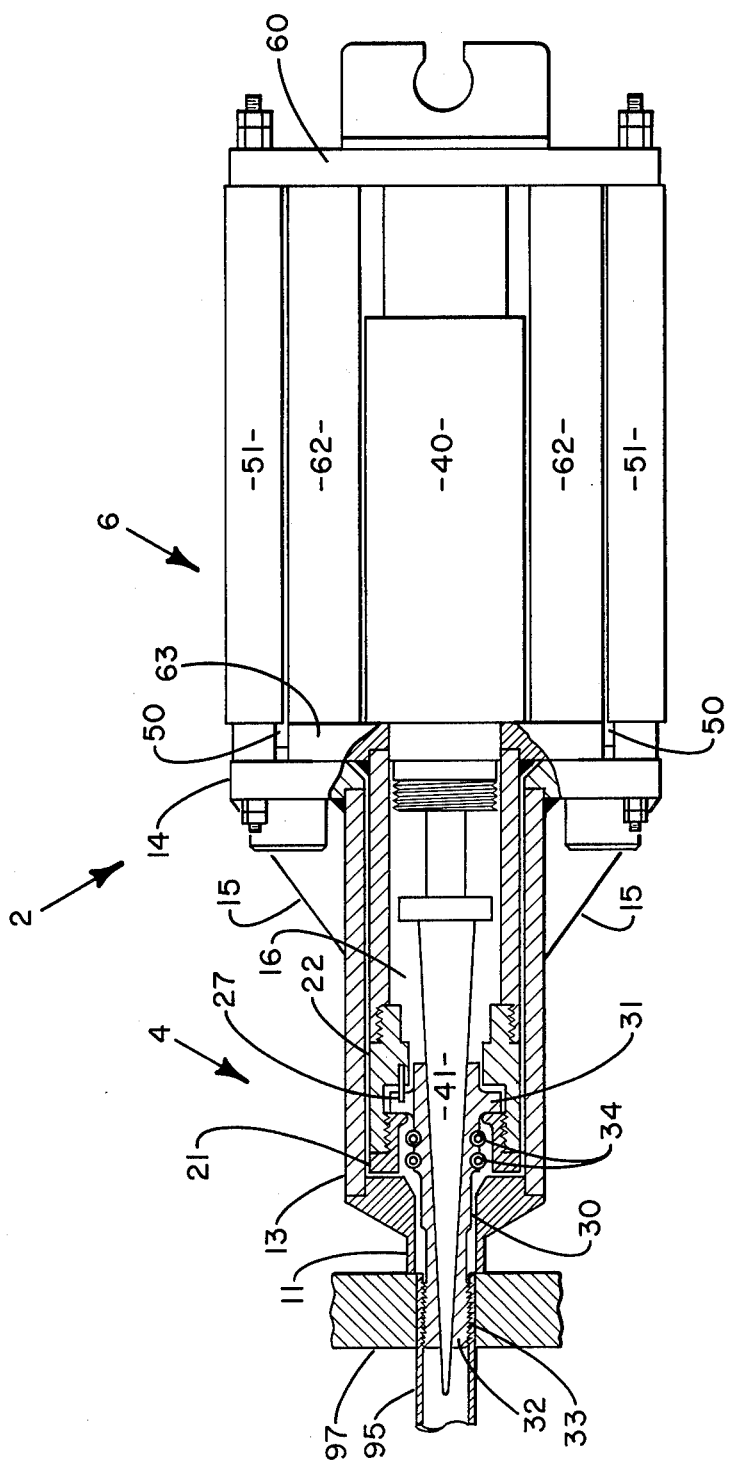
Figure 4:
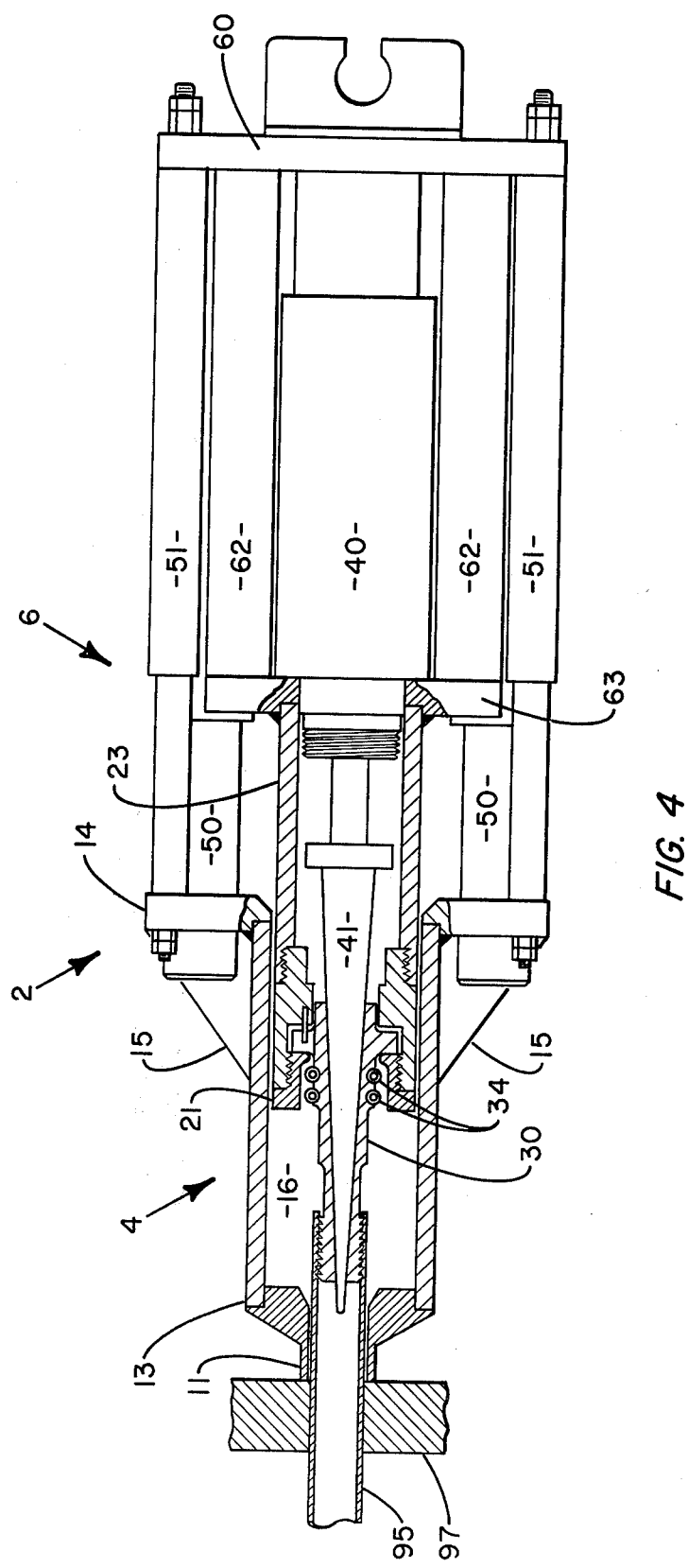

Referring now to FIGS. 2 through 4, cylindrical housing section 13 defines a longitudinally extending passageway 16 in communication with opening 12. The extracting mechanism 2 also comprises a sleeve 20 located in passageway 16 and slidably supported by cylindrical housing section 13 for longitudinal movement within the passageway. Within passageway 16, sleeve 20 can slide forward toward nose piece 11 and front opening 12, and the sleeve can slide rearward away from the nose piece and front opening. In the preferred embodiment illustrated in the drawings, sleeve 20 includes a front member 21, an intermediate member 22, and a back member 23, although it will be obvious to one skilled in the art that the intermediate and back members could be comprised of a single unitary member.

In the position shown in FIG. 2, jaw means 30 extends longitudinally from within sleeve 20 forward through nose piece 11, and through front opening 12. In this position, the extracting mechanism 2 can be placed against a tube sheet with nose piece 11 abutting the tube sheet and jaw means 30 extending inside a tube. Expandable jaw means 30 is comprised of a plurality of separate, longitudinally extending pieces 32, having gripping teeth 33 located at one end thereof. Pieces 32 cooperate to define an elongated, conically shaped cavity 35 extending through the center of expandable jaw means 30. Retaining means 34 such as garter springs are provided to urge individual pieces 32 radially inward, insuring that jaw means 30 radially contracts when this is desired.

Using separate pieces 32 to form jaw means 30 has several advantages. First, pieces 32, and hence expandable jaw means 30, can move radially outward without requiring bending by an individual component of the jaw means. Thus, bending forces and their resulting stresses are eliminated. Second, should some part of the jaw means 30 need to be replaced, it is not necessary to remove and replace the entire jaw means; but, rather, it is necessary to replace only the individual piece 32 having the part which needs to be replaced. In this manner, both the cost and difficulty of maintaining expandable jaw means 30 are reduced.

The rearward portion of pieces 32 include radially extending flanges 31. Flanges 31 cooperate with a recess 24 defined by front and intermediate members 21 and 22 of sleeve 20 to cause expandable jaw means 30 to move longitudinally with the sleeve. As sleeve 20 moves forward relative to expandable jaw means 30, a radially extending portion 25 of intermediate member 22 comes into abutting contact with rear portion of the flanges 31, forcing the expandable jaw means to move with the sleeve. Similarly, a sleeve 20 moves backward relative to expandable jaw means 30, a radially extending portion 26 of front member 21 comes into abutting contact with the front portion of flanges 31, causing the jaw means to move with the sleeve. Recess 24, though, allows for radial movement of expandable jaw means 30, and the recess allows for a small amount of relative longitudinal movement between the jaw means and sleeve 20 to prevent the recess from binding flanges 31 during radial expansion of the jaw means.

Figure 7:
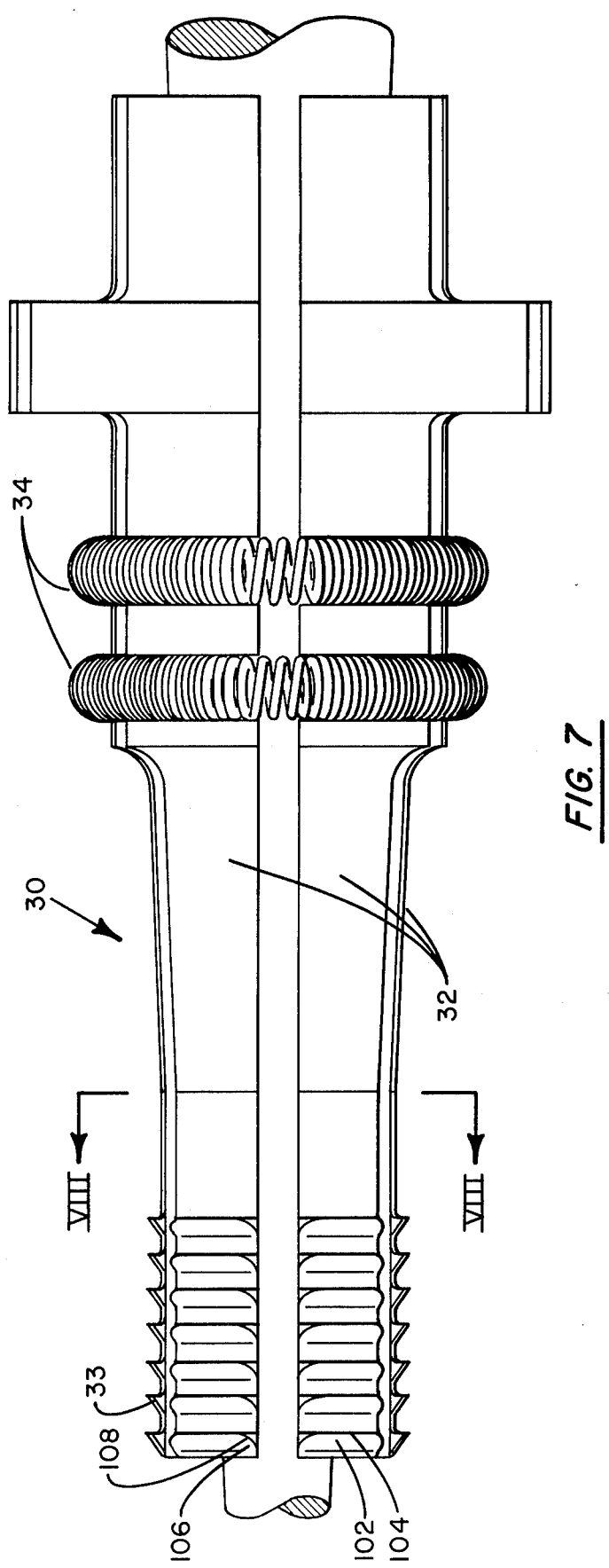
FIG. 7 is an enlarged side view of the jaw means of the extracting mechanism of the present invention, showing the jaw means in an expanded position and showing the teeth thereof in greater detail.
Figure 8:
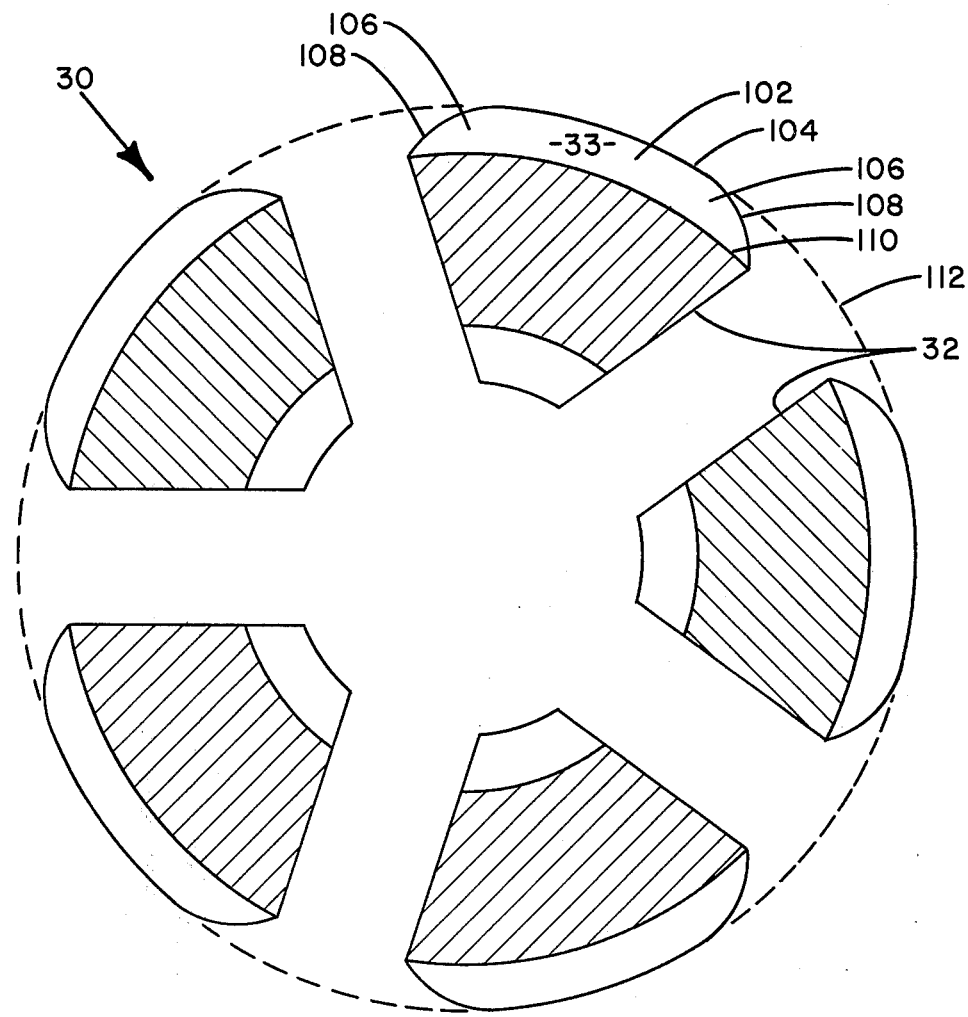
FIG. 8 is an enlarged cross-sectional view of the jaw means shown in FIG. 7 taken along line VIII—VIII of FIG. 7.
Figure 9:
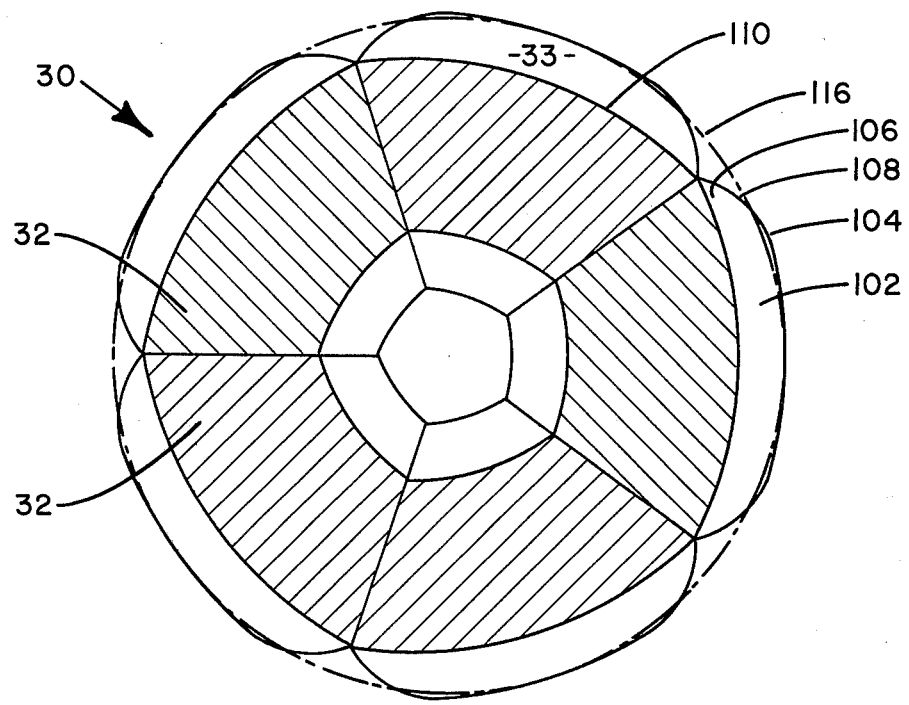
FIG. 9 is a cross-sectional view similar to FIG. 8, but with the jaw means of the present invention in a contracted position.

Referring particularly to FIGS. 7 through 9, teeth 33 extend annularly about and radially outward from jaw means 30. Each tooth 33 includes annularly extending central section 102 having gripping edge 104 generally defining an arc for engaging the interior surface of a tube, and a pair of end sections 106 wherein each end section annular extends from the central section and includes tapered edge 108, wherein the tapered edges radially taper inward toward the jaw means 30. In the preferred arrangement shown in the drawings, tapered edges 108 of end sections 106 radially taper inward to outside surface 110 of jaw means 30. As discussed in greater detail subsequently, tapering the annular ends of teeth 33 facilitates withdrawing jaw means 30 from a tube.

Figure 8A:
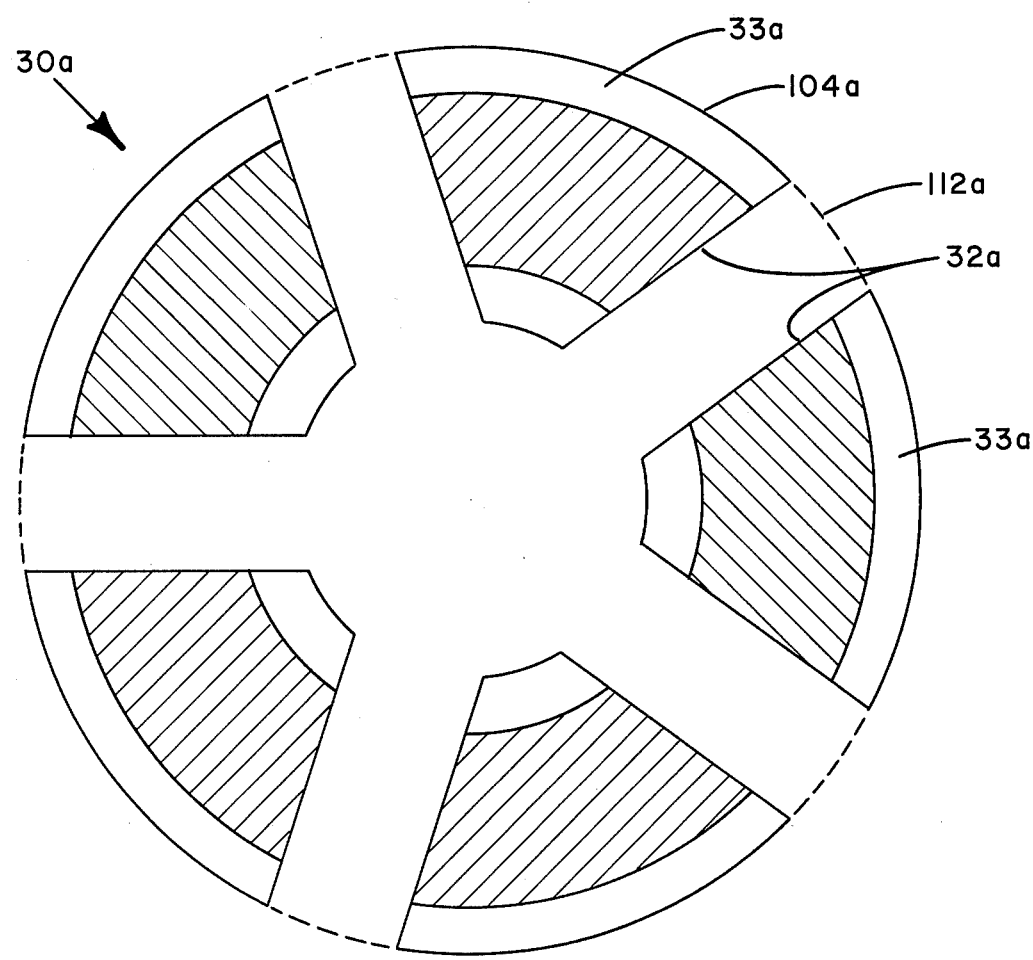
FIG. 8A is a cross-sectional view of a prior art jaw means, showing the jaw means in an expanded position.
Figure 9A:
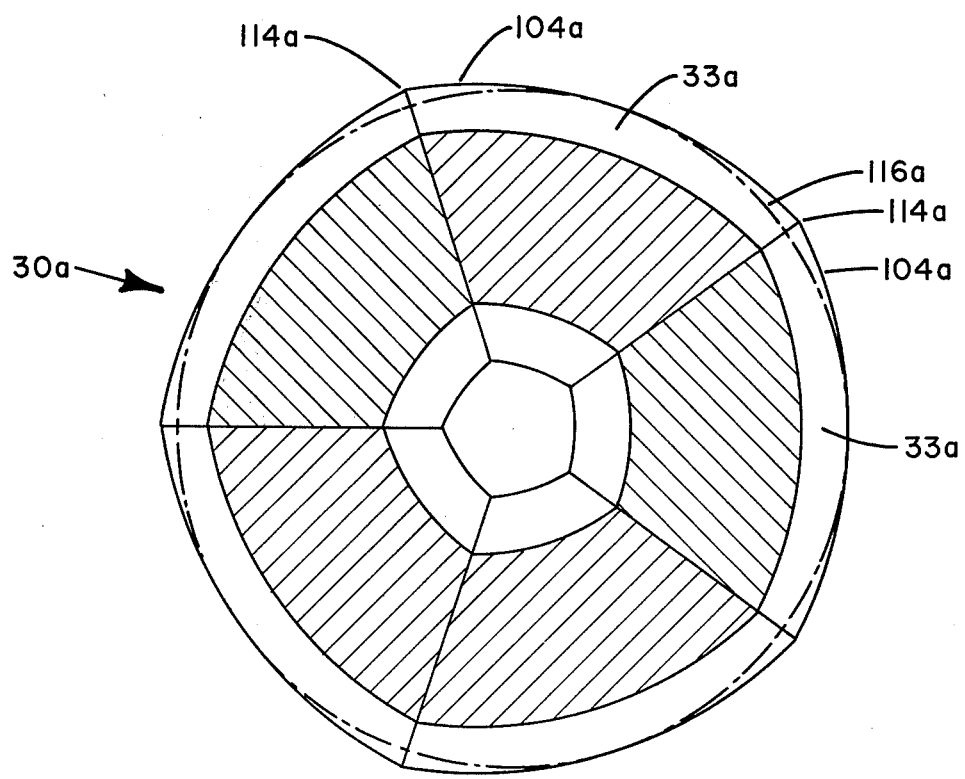
FIG. 9A is a cross-sectional view similar to FIG. 8A, but with the prior art jaw means in a contracted position.

It is believed that the advantages of tapering the annular ends of teeth 33 can be best understood by directly comparing jaw means 30 to a prior art jaw means. A prior art jaw means is shown in FIGS. 8A and 9A and referenced therein as 30a. FIG. 8A is a cross-sectional view of prior art jaw means 30a, showing the jaw means in an expanded position; and FIG. 9A is a cross-sectional view similar to FIG. 8A, but with prior art jaw means 30a in a contracted position. As may be appreciated, jaw means 30 and 30a have several common elements; and common elements are given like reference numbers, with the number for elements of prior art jaw means 30a given the suffix "a".

Referring to FIG. 8, the radius of curvature of gripping edges 104 of jaw means 30 of the present invention is chosen so that, when the jaw means is expanded to the position shown in FIG. 8, edges 104 of annularly adjacent teeth 33 define circle 112, shown in broken lines in FIG. 8. Similarly, referring to FIG. 8A, the radius of curvature of gripping edges 104a of prior art jaw means 30a is chosen so that edges 104a define circle 112a when jaw means 30a is in the expanded position shown in FIG. 8A. The circular shapes defined by edged 104 and 104a produce an excellent fit between jaw means 30 and 30a and the inside surface of a tube having a circular cross section of approximately the same size. More particularly, there is contact between teeth 33 or 33a and the inside surface of the tube along substantially the entire gripping edge 104 or 104a of each tooth. This provides for a very even distribution of the pressure between the tube and teeth 33 or 33a, reducing the maximum stress felt at any one point of the teeth and jaw means 30 or 30a. This, in turn, increases the useful life of the jaw means.

With prior art jaw means 30a, when the jaw means is radially contracted to the position shown in FIG. 9A, for example preparatory to withdrawing the jaw means and teeth 33a from a tube, gripping edges 104a to form a somewhat distorted circle, having high points 114a at annular ends of each tooth 33a. This distortion is due to the fact that the radial distance from the longitudinal centerline of jaw means 30a to gripping edges 104a decreases while the radius of curvature of the gripping edges does not change. To more clearly show high points 114a, an undistorted circle 116a is shown in FIG. 9A in a broken line. As shown in FIG. 9A, circle 116a has a radius equal to the distance from the longitudinal centerline of jaw means 30a to the mid points of gripping edges 104a, and circle 116a intersects edges 104a at these mid points. In between these mid points, as can be seen in FIG. 9A, edges 104a are radially spaced from circle 116a, forming high points 114a. As prior art jaw means 30a is withdrawn from a tube, high points 114a reduce the clearance between the inner side wall of the tube and teeth 33a, hindering efforts to withdraw the teeth and jaw means 30a from the tube. This difficulty is exacerbated by an inward deformation of material from the tube side wall which occurs when the tube is extracted from a tube sheet and which further reduces the clearance between the inner side wall of the tube and teeth 33a.

Referring to FIG. 9, in accordance with one aspect of the present invention it has been learned that by tapering annular ends of teeth 33 to form tapered end sections 106, the teeth do not form high points at their annular ends. To more clearly demonstrate this feature, circle 116 is shown in FIG. 9 in a broken line. Analogous to circle 116a of FIG. 9A, circle 116 has a radius equal to the distance from the longitudinal centerline of jaw means 30 to the mid points of gripping edges 104, and circle 116 intersects edges 104 at these mid points. As can readily be seen by comparing FIG. 9 with FIG. 9A, while edges 104a of prior art jaw means 30a radially extend outside circle 116a at the annular ends of teeth 33a, forming high points 114a, now such high points are formed at the annular ends of teeth 33 of jaw means 30 of the present invention. Because jaw means 30 of the present invention does not have these high points, the clearance between jaw means 30 and a tube, as jaw means 30 is withdrawn from the tube, is increased. This substantially facilitates withdrawing teeth 33 and jaw means 30 from the tube. Less time and skill are needed to withdraw jaw means 30 from the tube, decreasing the cost thereof. Furthermore, the amount of scrapping, dragging, or tearing between teeth 33 and the insides of the tube is decreased, and this increases the effective work life of the teeth.

Preferably, as mentioned previously, the annular ends of teeth 33 are tapered down to outside surface 110 of jaw means 30. Tapering teeth 33 to this extent—as opposed to, for example, tapering the annular ends of the teeth down to circle 116—substantially increases the total amount of space between the teeth and the inside surface of a tube when jaw means 30 is in the contracted position within the tube, but does not significantly further decrease the area of contact between the teeth and the tube when the jaw means and teeth are expanded into contact with the inner side wall of the tube. By increasing the space between teeth 33 and the inner side wall of the tube, the maneuverability of the teeth and jaw means 30 within the tube is improved, further facilitating withdrawing the teeth and jaw means from the tube. Moreover, each tapered edge 108 of a tooth preferably smoothly curves downward from gripping edges 102 of the tooth, forming a smooth, unbroken junction with the gripping edge. It will be apparent to one skilled in the art, though, that tapered edge 108 may be a straight edge, slanting downward toward surface 110. It has been learned, however, that without a smooth junction between tapered edges 104 and gripping edge 102, teeth 33 may tear the inner surface of a tube as the teeth are employed to extract a tube from a tube sheet, and the tube may not be pulled free from the tube sheet or the teeth may be damaged.

Jaw means 30 is constructed by forming a longitudinally extending and radially expandable body, shaping a plurality of teeth 33 extending annularly about and radially outward from the body, wherein each tooth includes a gripping edge 104 generally defining an arc, and then tapering the annular ends of the teeth to reduce the height thereof when the jaw means is in a radially contracted position. Preferably, jaw means 30 is formed by forming separable longitudinally extending membes 32, and urging these separable members radially inward together, for example by annularly encircling members 32 with springs 34. Members 32 are formed, in turn, by grinding a metal block, heat treating the metal, and then splitting the metal into separate members 32. Teeth 33 are formed integrally with separable members 32, and tapered end sections 106 are formed by filing annular ends of the teeth.

Over a period of time, teeth 33 of expandable jaw means 30 may become encrusted with deposits. Gripping teeth of tube extracting mechanisms of the type disclosed herein are commonly cleaned by moving or rotating a brush or other cleaning device around the toothed portion of jaw means 30. When this is done, the brush tends to rotate jaw means 30 about its longitudinal axis. Such rotation hinders cleaning of the teeth. Referring back to FIGS. 2 through 4, to facilitate cleaning of the teeth 33 of the device disclosed herein, a segment of one of the flanges 31 of jaw means 30 is somewhat shorter radially than the other flanges, and a small, longitudinally extending pin 27 is located in the recess 24 in an overlaying relationship with respect to this shorter segment. Pin 27 permits radial expansion of jaw means 30; but, as the jaw means starts to rotate about its longitudinal axis, either a side of the flange having the shorter segment or the side of a neighboring flange comes into abutting contact with pin 27, preventing further rotation.

Expansion power means 40 and expansion means 41 such as a mandrel are provided for expanding jaw means 30 radially. In a preferred embodiment, expansion power means 40 is a hydraulic cylinder having a head end and a piston end. The head end is connected to back plate 60 so that the two move together longitudinally, and extends forward therefrom coming into abutting contact with mid plate 63. The piston end of cylinder 40 extends forward from the front end of the head end, through mid plat 63. Mandrel 41 is connected to the piston end of cylinder 40 and includes a longitudinally extending, generally conically shaped portion wider at the back and gradually reducing in width toward the front until terminating at a point. Mandrel 41 extends from the piston end of cylinder 40 forwards within sleeve 20 and into longitudinal cavity 35 of expandable jaw means 30.

As hydraulic cylinder 40 expands, the piston end of the cylinder and mandrel 41 move forward longitudinally toward nose piece 11 and front opening 12 and away from back plate 60. The tapered mandrel 41 moves forward within longitudinal cavity 35 of expandable jaw means 30. This tends to force jaw means 30 forward and outward. Recess 24 of sleeve 20 limits forward movement of jaw means 30, but allows outward, radial movement. Thus, forward movement of mandrel 41 forces expandable jaw means 30 radially outward. Outward, radial movement of jaw means 30 and, hence, forward movement of mandrel 41 is limited by a radially extending shoulder 36 of the mandrel and a radially extending portion 28 of intermediate member 22 of sleeve 20. That is, mandrel 41 can move forward until shoulder 36 of mandrel 41 comes into abutting contact with portion 28 of intermediate member 22, and this abutting contact prevents further forward movement of the mandrel and further outward movement of the jaw means. As will be shown below, extension of expansion hydraulic cylinder 40 and, hence, forward movement of mandrel 41 and radial expansion of jaw means 30 are also pressure regulated and will terminate when a preset pressure is reached between the jaw means and the inside surface of a tube.

With the prior art devices, as exemplified by those shown in the above-cited references, as well as with Applicant's mechanism, as the expansion means or mandrel moves to expand the jaw means into pressure contact with the inside surface of a tube, the mandrel comes into contact with the jaw means directly below the gripping teeth of the jaw means. This is desirable because it provides localized support for the teeth, which are in direct pressure contact with the tube. Further, it is the contact between the mandrel and the jaw means that expands the jaw means. The prior art devices expand the jaw means by rearward movement of the mandrel. This requires, in order that the above-discussed localized tooth support be provided, that the mandrel extend, when the jaw means is in the retracted position, forward of the toothed section of the jaw means. With Applicant's unique apparatus and method, on the other hand, since the mandrel moves forward to expand and jaw means—the opposite of the prior art—the mandrel does not have to extend forward of the toothed section when the jaw means is retracted. The mandrel may come, as shown in FIG. 2, to a tapered end within the toothed section of the jaw means.

Bringing mandrel 41 to a tapered end within jaw means 30 has several advantages. The narrowest width of longitudinal cavity 35 defined by jaw means 30 is decreased, increasing the difference between the widest and narrowest widths of the cavity which communicate with mandrel 41. Also, the narrowest width of mandrel 41 is decreased, increasing the difference between the widest and narrowest widths of the mandrel which communicate with cavity 35. Since these differences determine the expansion range of jaw means 30, Applicant's invention, by increasing these differences, increases the expansion range of the jaw means, increasing the utility of the extracting mechanism 2. These increased differences also allow the minimum width of jaw means 30 to be decreased, and, at the same time, allow the width of the separate pieces 32 to be increased. The decreased minimum width of jaw means 30 increases freedom of movement of the jaw means within a tube. The greater width of pieces 32, which comprise jaw means 30, increases the strength of the pieces 32, increasing the strength of the jaw means.

A further advantage of the device disclosed herein is that the longitudinal slope of cavity 35 remains substantially constant as jaw means 30 radially expands. Moreover, this slope generally equals the longitudinal slope of the conical portion of mandrel 41. In this manner, as mandrel 41 moves forward within cavity 35, the mandrel and the surface of jaw means 30 which defines longitudinal cavity 35 are in contact for substantially their entire common length. The mandrel 41 provides a very evenly distributed support for jaw means 30, reducing the maximum stress felt at any one point of the jaw means and increasing the operational lifespan of the jaw means. In addition, with the above-discussed matching slopes between cavity 35 and mandrel 41 and with jaw means 30 comprising separable members 32, the jaw means radially expands outward at a uniform rate throughout its axial length. Thus, all gripping teeth 33, regardless of their different axial location on jaw means 30, uniformly expand into the inside surface of a tube, and the total pressure between the teeth and the tube is equally shared among the teeth.

Pulling power means 50 is provided to move jaw means 30 longitudinally with respect to stationary frame 4. In a preferred mode, the pulling power means includes a pair of hydraulic cylinders 50 each having a piston end secured to front plate 14 of stationary frame 4, and a head end connected to back plate 60 of movable frame 6. Springs 51, also arranged between front plate 14 and back plate 60, are provided to bias the cylinders 50 to the retracted position. As pulling hydraulic cylinders 50 extend, back plate 60, connecting members 62 and mid plate 63 are forced apart from front plate 14. Similarly, when hydraulic cylinders 50 retract, back plate 60, connecting members 62 and mid plate 63 are brought toward front plate 14. Sleeve 20, and more particularly back member 23 of the sleeve, is connected to back plate 60 through connecting members 62 and mid plate 63 so that, as the back plate 60 moves relative to stationary frame 4, either toward the front of the stationary frame or away from the front of the stationary frame, the sleeve moves in a similar fashion relative to the stationary frame. Connecting members 62 are curved to closely fit against the generally cylindrical hydraulic cylinders 50 and also act as guides for the cylinders as they extend and retract.

As sleeve 20 is moved by pulling hydraulic cylinders 50, recess 24 of the sleeve and flanges 31 of expandable jaw means 30 cooperate, in the manner described above, to move the jaw means with the sleeve. As discussed above, the head end of expansion hyraulic cylinder 40 is connected to back plate 60 and moves with the back plate. Moreover, as explained below, when pulling power cylinders 50 extend, pressurized fluid is locked into expansion cylinder 40 so that the piston end of the cylinder and mandrel 41, which is connected to the piston end, moves with the head end of the cylinder. Thus, as pulling hydraulic cylinders 50 expand, jaw means 30 and mandrel 41 both move rearward with back plate 60 and, hence, with each other. This unitary movement of jaw means 30 and mandrel 41 has the effect of causing the jaw means to maintain the same degree of radial expansion as it moves rearward.

Figure 5:
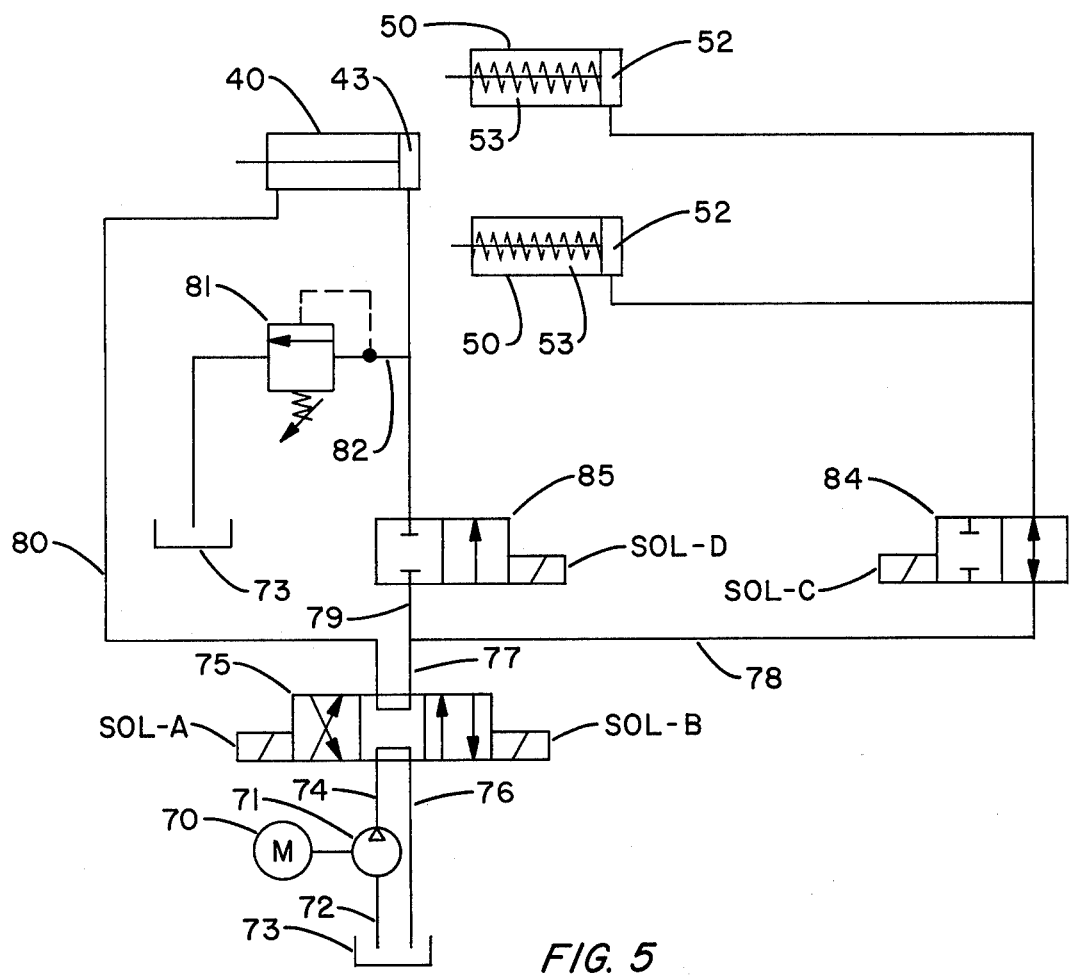
FIG. 5 is a schematic view of the hydraulic circuit of the extracting mechanism shown in FIGS. 1 through 4.
Figure 6:
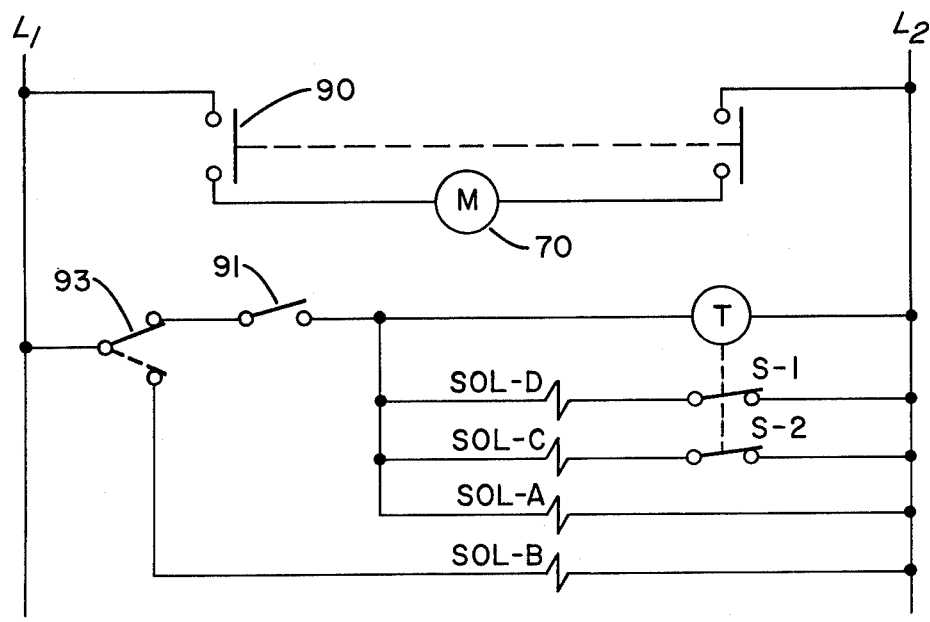
FIG. 6 is a schematic view of the electrical circuit of the extracting mechanism shown in FIGS. 1 through 4.

The control circuit for the extracting mechanism 2 is preferably electro-hydraulic. The hydraulic circuit is shown in FIG. 5, and the electric circuit is shown in FIG. 6. Referring to FIG. 5, the hydraulic circuit includes a motor 70 that operates a hydraulic pump 71. Pump 71 is connected through line 72 to a source of fluid represented by reservoir 73. The discharge from pump 71 flows through line 74 and passes through a three position control valve 75. Preferably, control valve 75 is biased toward a center position by, for example, opposed springs (not shown), and means such as electrically activated solenoids A and B are provided to move the control valve to the right and left, respectively, as viewed in FIG. 5. When control valve 75 is in the center, or neutral, position the discharge from pump 71 is directed back to reservoir 73 through line 76.

When solenoid A is activated, control valve 75 is moved to the right, to an advance position, and the discharge from pump 71 passes through control valve 75 to fluid line 77 and to branch lines 78 and 79. Branch line 79 directs the fluid to the head end of expansion hydraulic cylinder 40. When pressurized fluid flows through line 79 to cylinder 40, the fluid pushes a piston 43, located in the cylinder, to the left as viewed in FIG. 5, expanding the cylinder. As discussed above, expansion of cylinder 40 causes radial expansion of jaw means 30. A pilot activated fluid pressure valve 81 is in fluid communication with line 79 via line 82 and regulates the maximum pressure reached in line 79. Valve 81 is biased toward a closed position, and opens when the pressure in line 79 reaches a predetermined level. When this pressure level is reached, fluid is vented from line 79, through line 82, through the valve 81, and to reservoir 73. In this manner, expansion hydraulic cylinder 40 expands jaw means 30 until a predetermined pressure is reached between the jaw means and the inside surface of a tube. A detailed discussion of the advantages of pressure regulated jaw means is more fully set forth in U.S. Pat. No. 4,077,102, granted on Mar. 7, 1978 to Joseph W. Smith for a "Tube Extracting Mechanism."

At the same time that branch line 79 directs fluid to the head end of expansion cylinder 40, branch line 78 directs fluid to the head ends of pulling hydraulic cylinders 50. When pressurized fluid flows through line 78 to the cylinders 50, the fluid pushes pistons 52, located in the cylinders, to the left as viewed in FIG. 5, expanding these cylinders. Expansion of cylinders 50, as explained above, cause back plate 60, sleeve 20, and expandable jaw means 30 all to move backwards relative to stationary frame 4. Referring back to FIGS. 1 through 4, the expansion of hydraulic cylinders 50 extend external springs 51, which urge the cylinders toward the retracted position. Returning to FIG. 5, additional springs 53, located within cylinders 50, are contracted when the cylinders are extended, further urging the cylinders to the retracted position.

The hydraulic fluid circuit also includes control valve 84, placed in line 78, and control valve 85, placed in line 79, for regulating the fluid flow through the respective fluid lines. Each control valve has two positions: an open position, allowing fluid to flow through the line in which the valve is located, and a closed position, preventing fluid from flowing through the line. Valve 84 is biased toward the open position, and valve 85 is biased toward the closed position. Control means, preferably electrically actuated solenoids C and D, are provided for, respectively, moving control valve 84 to the closed position and moving control valve 85 to the open position. Automatic sequential activation of solenoids C and D provides automatic successive extension of expansion hydraulic cylinder 40 and pulling hydraulic cylinders 50. This, in turn, results in the extracting mechanism automatically, first, expanding jaw means 30 into contact with the inside surface of a tube; and then, second, pulling the tube out of the tube sheet.

Returning to solenoid B, when this solenoid is activated, control valve 75 is moved to the left as viewed in FIG. 5, to a retract position, and pressurized fluid flows through control valve 75 to line 80. Fluid line 80 directs the pressurized fluid to the piston end of expansion hydraulic cylinder 40. The fluid pushes cylinder piston 43 toward the head end of the cylinder, causing the cylinder to retract. Fluid forced out of the head end of hydraulic cylinder 50 passes through fluid lines 79 and 77, through control valve 75, through fluid line 76, and to the reservoir 73. Concurrently, fluid is vented from the head ends of pulling hydraulic cylinders 50, under pressure of springs 51 and 53, contracting these cylinders. The vented fluid from cylinders 50 passes through lines 78 and 77, through control valve 75, through fluid line 76, and to reservoir 73.

Referring to FIG. 6, the electric control circuit for the extracting mechanism 2 includes a switch 90 to actuate motor 70, which is connected through the switch to a source of electrical energy represented by lines L1 and L2. The electrical circuit also includes a normally open advance switch 91 and a retract switch 93, normally in the position shown in the full line in FIG. 6. Closing switch 91 activates a timer means T and closes switches S-1 and S-2. Switches S-1 and S-2 are located in series with, respectively, solenoids D and C. When switches 91, S-1 and S-2 are closed, solenoids A, C, and D are activated, causing, as discussed above, jaw means 30 to expand radially into pressure contact with the inside surface of a tube. The timer means T automatically deactivates after a predetermined period of time and, upon deactivation of timer means T, switches S-1 and S-2 are opened. This deactivates solenoids C and D, locking jaw means 30 into contact with the inside of the tube and causing pulling power cylinders 50 to expand, pulling the tube out of the tube sheet. When the tube is released from the tube sheet, switch 91 is opened and switch 93 is moved to broken line position shown in FIG. 6. This deactivates solenoid A and activates solenoid B. Pulling cylinders 50 and expansion cylinder 40 are retracted, and the grip which jaw means 30 has on the tube is released. When cylinders 40 and 50 are completely retracted, switch 93 is moved back to the full line position.

Figure 5A:
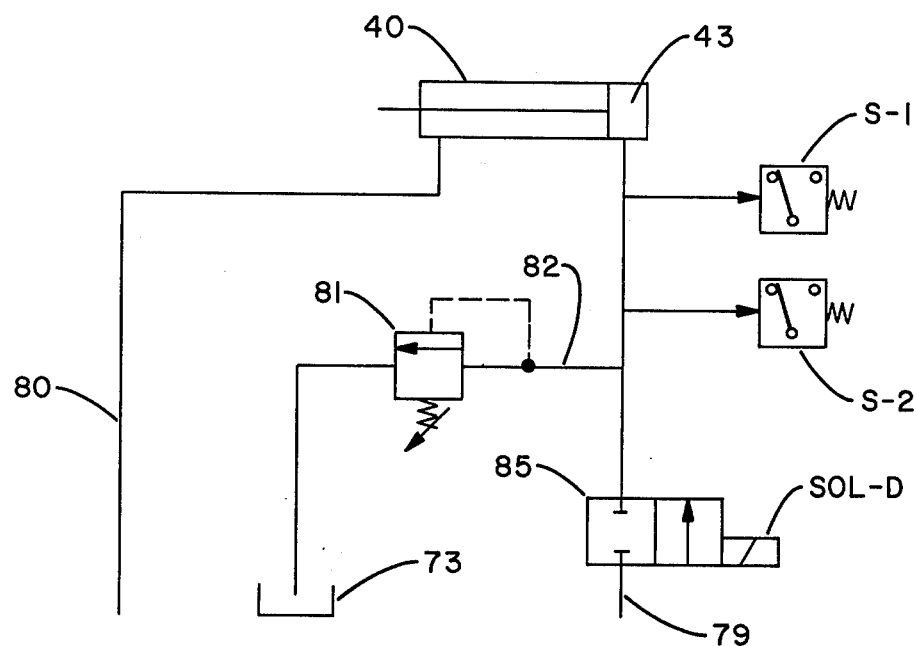
FIG. 5A is a schematic view of a portion of an alternate hydraulic circuit.

Although preferably switches S-1 and S-2 are time responsive, opening upon deactivation of timer means T, they could be pressure responsive, opening when a predetermined pressure is reached in the fluid line 79 leading to the head end of expansion hydraulic cylinder 40. Such an arrangement is shown in FIG. 5A.

Although the operation of extracting mechanism 2 and the method embodying the present invention has been discussed somewhat above, this operation will now be more fully described. In the retracted or inactive position, shown in FIG. 1, expandable jaw means 30 extends through nose piece 11 and front opening 12 of stationary frame 4, and hydraulic cylinders 40 and 50 are fully retracted. With respect to the hydraulic circuit shown in FIG. 5, control valve 75 is in the central or neutral position, control valve 84 is in the open position, and control valve 85 is in the closed position. Concerning the electric circuit depicted in FIG. 6, switches 90 and 91 are open, and switch 93 is in the solid line position shown in the Figure.

To extract a tube 95 from a tube sheet 97, shown in FIGS. 2 through 4, switch 90 is closed, activating motor 70 and pump 71, and extracting mechanism 2 is moved so that jaw means 30 is inserted into the tube and nose piece 11 abuts against the tube sheet. This position is shown in FIG. 2. Then switch 91 is closed, activating solenoids A, C, and D, and timer means T, and closing switches S-1 and S-2. As solenoid A is activated, three-way fluid flow control valve 75 is moved to the advance position. This directs fluid from pump 71 to line 77 and into lines 78 and 79. At the same time, activation of solenoid C moves valve 84 to the closed position, preventing fluid from flowing through line 78; and activation of solenoid D moves valve 85 to the open position, allowing fluid to flow through line 79 to the head end of expansion hydraulic cylinder 40, causing that cylinder to extend.

Figure 10:
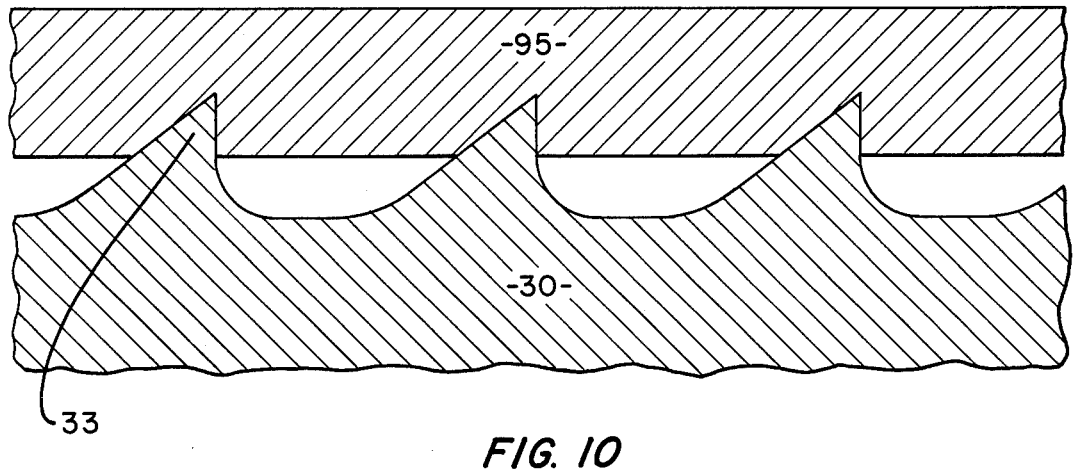
FIGS. 10 and 11 are sectional views showing the teeth of the extracting mechanism of the present invention engaged with the inner side wall of a tube.

Extension of expansion hydraulic cylinder 40 moves expansion means 41 to the left as viewed in FIG. 2 forcing expandable jaw means 30 outward radially. This continues and expandable jaw means 30 comes into contact with the inside surface of tube 95. This position is shown in FIG. 3, and an enlarged cross-sectional view of teeth 33 of jaw means 30 engaged with tube 95 is shown in FIG. 10. Pressure builds up in expansion cylinder 40 and fluid line 79, causing pressure to build up between jaw means 30 and the inside surface of the tube 95, until the predetermined pressure is reached, opening pressure relief valve 81. The pressure at which relief valve 81 opens can be set, depending on the size and type of the tube 95, to insure that a secure grip is developed between jaw means 30 and the inside surface of the tube.

After a predetermined length of time, timer means T automatically deactivates. This time length can be adjusted to insure that expansion hydraulic cylinder 40 is given a sufficient amount of time to develop the desired pressure between jaw means 30 and the inside surface of tube 95. Deactivation of the timer means opens switches S-1 and S-2, deactivating solenoids C and D. When this occurs, control valve 85 moves to the closed position, locking the pressurized fluid in expansion hydraulic cylinder 40; and control valve 84 moves to the open position, allowing pressurized fluid to flow through line 78 to extend pulling hydraulic cylinders 50.

Figure 11:
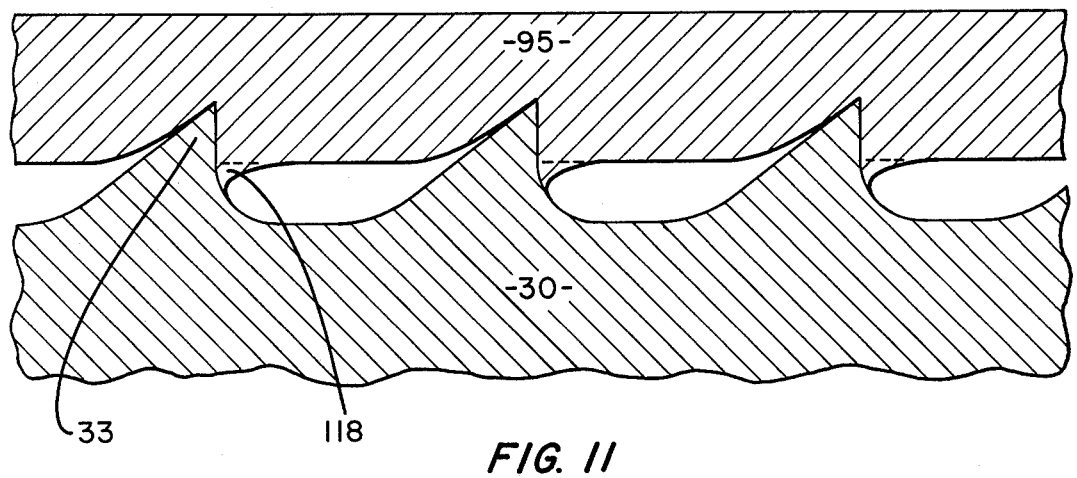

As pulling power cylinders 50 extend, back plate 60 is pushed rearwardly relative to stationary frame 4 and tube sheet 97. This pulls connecting pieces 62, mid plate 63, sleeve 20, and expandable jaw means 30 rearwardly. Rearward movement of back plate 60 and mid plate 63 also pulls expansion hydraulic cylinder 40 and mandrel 41 rearwardly. Thus, the relative position between jaw means 30 and the mandrel 41 is maintained, maintaining the secure grip which jaw means 30 has on tube 95. This grip is sufficient to pull tube 95 out of tube sheet 97; and, thus, extension of pulling hydraulic cylinders 50 pulls tube 95 out of tube sheet 97, as shown in FIG. 4. This pulling process continues until pulling hydraulic cylinders 50 are fully extended. During this extraction process, portions of the side wall of tube 95 engaged by teeth 33 are pushed inward by the teeth along sides thereof, as indicated at 118 in FIG. 11. This inward deformation reduces the inside diameter of tube 95.

To release the grip which jaw means 30 has on tube 95 and to return extracting mechanism 2 to the retracted position, advance switch 91 is opened and retract switch 93 is moved to the position shown in broken lines in FIG. 6. This activates solenoid B and deactivates solenoid A, causing control valve 75 to move to the left, as viewed in FIG. 5, to the retract position. Pressurized fluid is now directed through line 80 to the piston end of expansion hydraulic cylinder 50, retracting that cylinder. This pulls mandrel 41 rearwardly, and expandable jaw means 30, acting under the pressure of retaining means 34, contracts radially. This frees tube 95 from jaw means 30, and extracting mechanism 2 can be pulled away from the tube and tube sheet 97. The reduced height of annular ends of teeth 33, caused by the above-described tapering, substantially assists withdrawing jaw means 30 from the tube without scraping or dragging the teeth against the tube, decreasing the cost of the tube extracting process and increasing the work life of the teeth. Once jaw means 30 and extracting mechanism 2 are pulled away from tube 95 and tube sheet 97, the tube can be manually pulled completely out of the tube sheet.

Fluid forced out of the head end of cylinder 50, as that cylinder retracts, passes to reservoir 73 via lines 79 and 82. Moving control valve 75 to the retract position also vents fluid, under pressure of springs 51 and 53, from pulling hydraulic cylinders 50 via lines 78, 77, and 76, allowing those cylinders to retract. Retract switch 93 is held in the broken line position, maintaining control valve 75 in the retract position, until expansion cylinder 40 and pulling cylinders 50 completely retract. As this occurs, sleeve 20, jaw means 30, and mandrel 41 return to the retracted positon. When this occurs, switch 93 is moved to the solid line position, deactivating solenoid B so that hydraulic control valve 75 returns to the neutral position, and the extracting mechanism 2 is ready to pull the next tube.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments that fall within the true spirit and scope of the invention.

What is claimed is:

1. A tube extracting mechanism comprising:
   an elongated frame defining an opening in the front end thereof and a longitudinally extending passageway in communication with the opening;
   a back plate located rearward of the frame;
   a mid plate located between the back plate and the frame;
   connecting means connecting the back and mid plates for unitary longitudinal movement;
   a sleeve positioned in the passageway, slidably supported by the frame for longitudinal movement within the passageway in a first direction towards the opening and in a second direction away from the opening, and connected to the mid plate for unitary longitudinal movement therewith;
   expandable jaw means supported by the sleeve for longitudinal movement therewith, wherein the jaw means is movable through the opening;
   expansion means in communication with the expandable jaw means for expanding the jaw means, wherein longitudinal movement of the expansion means in the first direction expands the jaw means;
   expansion power means connected to the back plate for unitary longitudinal movement therewith, and connected to the expansion means for imparting longitudinal movement in the first direction to the expansion means; and
   pulling power means connected to the frame and the back plate for imparting longitudinal movement in the second direction to the back plate, the mid plate, the sleeve, and the expandable jaw means.

2. A tube extracting mechanism as defined by claim 1 wherein:
   a surface of the jaw means defines a longitudinally extending cavity;
   the expansion means includes a longitudinally extending, tapered portion in communication with the cavity;
   the longitudinal slope of the cavity remains substantially constant as the jaw means expands; and
   the longitudinal slope of the tapered portion of the expansion means substantially equals the longitudinal slope of the cavity so that, as the expansion means moves longitudinally with respect to the expandable jaw means, the tapered portion of the expansion means and the surface of the expandable jaw means which defines the cavity remain in contact for substantially their entire common length.

3. A tube extracting mechanism as defined by claim 2 wherein the expandable jaw means comprises:
   a plurality of separable sections; and
   retaining means for urging the separable sections inward radially.

4. A tube extracting mechanism as defined by claim 3 wherein:
   the retaining means includes a plurality of garter springs; and further comprising:
   means to prevent the expandable jaw means from rotating relative to the frame.

5. A tube extracting mechanism as defined by claim 1 wherein:
   abutting contact between the frame and the mid plate limits longitudinal movement of the mid plate in the first direction; and
   abutting contact between the mid plate and the expansion power means assists moving the expansion power means with the back plate.

6. A tube extracting mechanism comprising:
   an elongated frame defining an opening in the front end thereof and a longitudinally extending passageway in communication with the opening;
   a sleeve positioned in the passageway and slidably supported by the frame for longitudinal movement within the passageway in a first direction towards the opening and in a second direction away from the opening;
   expandable jaw means supported by the sleeve for longitudinal movement therewith, wherein the jaw means is movable through the opening;
   expansion means in communication with the expandable jaw means for expanding the jaw means, wherein longitudinal movement of the expansion means in the first direction expands the jaw means;
expansion power means including a first longitudinally reciprocable hydraulic cylinder for imparting longitudinal movement in the first direction to the expansion means;
pulling power means including a second longitudinally reciprocable hydraulic cylinder connected to the frame for imparting longitudinal movement in the second direction to the sleeve and expandable jaw means;
a source of pressurized hydraulic fluid;
a hydraulic fluid circuit connecting the first and second hydraulic cylinders to the source of pressurized fluid, including,
a circuit control valve having an advance position for directing pressurized fluid to the first and second hydraulic cylinders to extend the cylinders, and a neutral position for preventing pressurized fluid from flowing to the cylinders,
an expansion cylinder control valve having an open position allowing pressurized fluid to flow to the first hydraulic cylinder to extend the cylinder, and a closed position preventing pressurized fluid from flowing to the first cylinder, and
a pulling cylinder control valve having an open position allowing pressurized fluid to flow to the second hydraulic cylinder to extend the cylinder, and a closed position for preventing pressurized fluid from flowing to the second cylinder; and
control means including,
first means to move the circuit control valve to the advance position, second means to move the expansion cylinder control valve to the closed position, and third means to move the pulling cylinder control valve to the open position.

7. A tube extracting mechanism as defined by claim 6 further including timer means to activate the third moving means after the expansion cylinder control valve has been in the open position for a preset length of time.

8. A tube extracting mechanism as defined by claim 6 further including pressure responsive means to activate the third moving means after a preset pressure has been applied to the first hydraulic cylinder.

9. A tube extracting mechanism as defined by claims 7 or 8 wherein:
the first moving means includes a first electrically actuated solenoid;
the second moving means includes a second electrically actuated solenoid;
the third moving means includes a third electrically actuated solenoid;
the circuit control valve has a third position for directing pressurized fluid to the first hydraulic cylinder to retract the cylinder; and further including:
a fourth electrically actuated solenoid for moving the circuit control valve to the third position.

10. A tube extracting mechanism comprising:
an elongated frame defining an opening in the front end thereof and a longitudinally extending passageway in communication with the opening;
a sleeve positioned in the passageway and slidably supported by the frame for longitudinal movement within the passageway in a first direction towards the opening and in a second direction away from the opening;
expandable jaw means supported by the sleeve for longitudinal movement therewith, wherein the jaw means is movable through the opening and including a plurality of annularly and radially extending gripping teeth, wherein each tooth includes
an annularly extending central section having a gripping edge generally defining an arc for engaging the inside surface of a tube, and
a pair of tapered end sections wherein each end section annularly extends from the central section and includes a tapered edge, wherein the tapered edges radially taper inward to facilitate withdrawing the jaw means from the tube;
expansion means in communication with the expandable jaw means for expanding the jaw means, wherein longitudinal movement of the expansion means in the first direction expands the jaw means;
expansion power means for imparting longitudinal movement in the first direction to the expansion means; and
pulling power means connected to the frame for imparting longitudinal movement in the second direction to the sleeve and expandable jaw means.

11. A tube extracting mechanism comprising:
an elongated frame;
expandable jaw means supported by the frame for longitudinal movement relative to the frame and including a plurality of annularly and radially extending teeth wherein each tooth includes
an annularly extending central section having a gripping edge generally defining an arc for engaging the inside surface of a tube, and
a pair of end sections wherein each end section annularly extends from the central section and includes a tapered edge, wherein the tapered edges radially taper inward to facilitate withdrawing the jaw means from the tube;
expansion means in communication with the expandable jaw means wherein longitudinal movement of the expansion means expands the jaw means; and
power means supported by the frame for imparting longitudinal movement to the jaw means and the expansion means.

12. Jaw means for gripping a tube comprising:
a longitudinally extending and radially expandable body; and
a plurality of teeth extending annularly about and radially outward from the body, wherein each tooth includes
an annularly extending central section having a gripping edge generally defining an arc for engaging the interior surface of the tube, and
a pair of end sections wherein each end section annularly extends from the central section and includes a tapered edge, wherein the tapered edges radially taper inward toward the body to facilitate withdrawing the jaw means from the tube.

13. The invention as defined by claims 10, 11 or 12 wherein each tapered edge of a tooth and the gripping edge of the tooth form a smooth junction.

14. The tube gripping apparatus as defined by claim 13 wherein the tapered edges radially taper inward to a surface of the jaw means.

15. The tube gripping apparatus as defined by claim 14 wherein the jaw means includes a plurality of separable, longitudinally extending members.

* * * * *